US010659255B1

(12) United States Patent
Medamana et al.

(10) Patent No.: US 10,659,255 B1
(45) Date of Patent: May 19, 2020

(54) IDENTITY-BASED VIRTUAL PRIVATE NETWORK TUNNELING

(71) Applicant: AT&T Intellectual Property I, L.P., Atlanta, GA (US)

(72) Inventors: John Medamana, Colts Neck, NJ (US); Michael Satterlee, Clifton Park, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 7 days.

(21) Appl. No.: 16/182,351

(22) Filed: Nov. 6, 2018

(51) Int. Cl.
*H04L 12/24* (2006.01)
*H04L 12/46* (2006.01)
*H04L 29/08* (2006.01)

(52) U.S. Cl.
CPC ...... *H04L 12/4641* (2013.01); *H04L 41/0803* (2013.01); *H04L 67/306* (2013.01)

(58) Field of Classification Search
CPC .............. H04L 12/4641; H04L 67/306; H04L 41/0803; H04L 12/24
See application file for complete search history.

(56) References Cited

U.S. PATENT DOCUMENTS

| 7,849,505 | B2* | 12/2010 | Satterlee | H04L 12/4679 713/153 |
| 2008/0159175 | A1* | 7/2008 | Flack | H04L 41/0806 370/257 |
| 2009/0059814 | A1* | 3/2009 | Nixon | H04W 16/18 370/254 |
| 2013/0132499 | A1* | 5/2013 | Wu | H04L 41/0816 709/208 |
| 2014/0222980 | A1* | 8/2014 | Hagiwara | H04L 41/0803 709/222 |
| 2014/0310393 | A1* | 10/2014 | Baba | H04L 41/022 709/223 |
| 2017/0156158 | A1* | 6/2017 | Harris | H04W 52/0216 |

* cited by examiner

*Primary Examiner* — Mohamed A Kamara

(57) ABSTRACT

Devices, computer-readable media, and methods for routing traffic of a network service via a virtual private network that is configured in accordance with a virtual private network configuration preference of an identified user are described. A method may determine a network service that an endpoint device is attempting to access and may detect an identity of a user of the endpoint device. The processing system may obtain a plurality of virtual private network configuration preferences of the user, each of the plurality of virtual private network configuration preferences matching a virtual private network configuration preference with one or more of a plurality of network services, and route traffic of the endpoint device for the network service via a virtual private network that is configured in accordance with a virtual private network configuration preference of the plurality of virtual private network configuration preferences.

20 Claims, 3 Drawing Sheets

IDENTITY-BASED VIRTUAL PRIVATE NETWORK TUNNELING

The present disclosure relates generally to virtual private networks, and more particularly to methods, computer-readable media, and devices for routing traffic of an endpoint device for a first network service via a virtual private network that is configured in accordance with a virtual private network configuration preference of an identified user.

BACKGROUND

Existing virtual private networks (VPNs) are established only according to location/site. As such, existing network configurations do not obtain user-specific information for establishing VPNs.

SUMMARY

In one example, the present disclosure describes a device, computer-readable medium and method for routing traffic of a network service via a virtual private network that is configured in accordance with a virtual private network configuration preference of an identified user. For instance, in one example, a processing system including at least one processor may determine a first network service that an endpoint device is attempting to access, wherein the first network service is one of a plurality of network services, and may detect an identity of a user of the endpoint device. The processing system may obtain, from a network-based device, a plurality of virtual private network configuration preferences of the user, wherein each of the plurality of virtual private network configuration preferences is matched with one or more of the plurality of network services, and may route traffic of the endpoint device for the first network service via a virtual private network that is configured in accordance with a virtual private network configuration preference of the plurality of virtual private network configuration preferences that is matched to the first network service.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
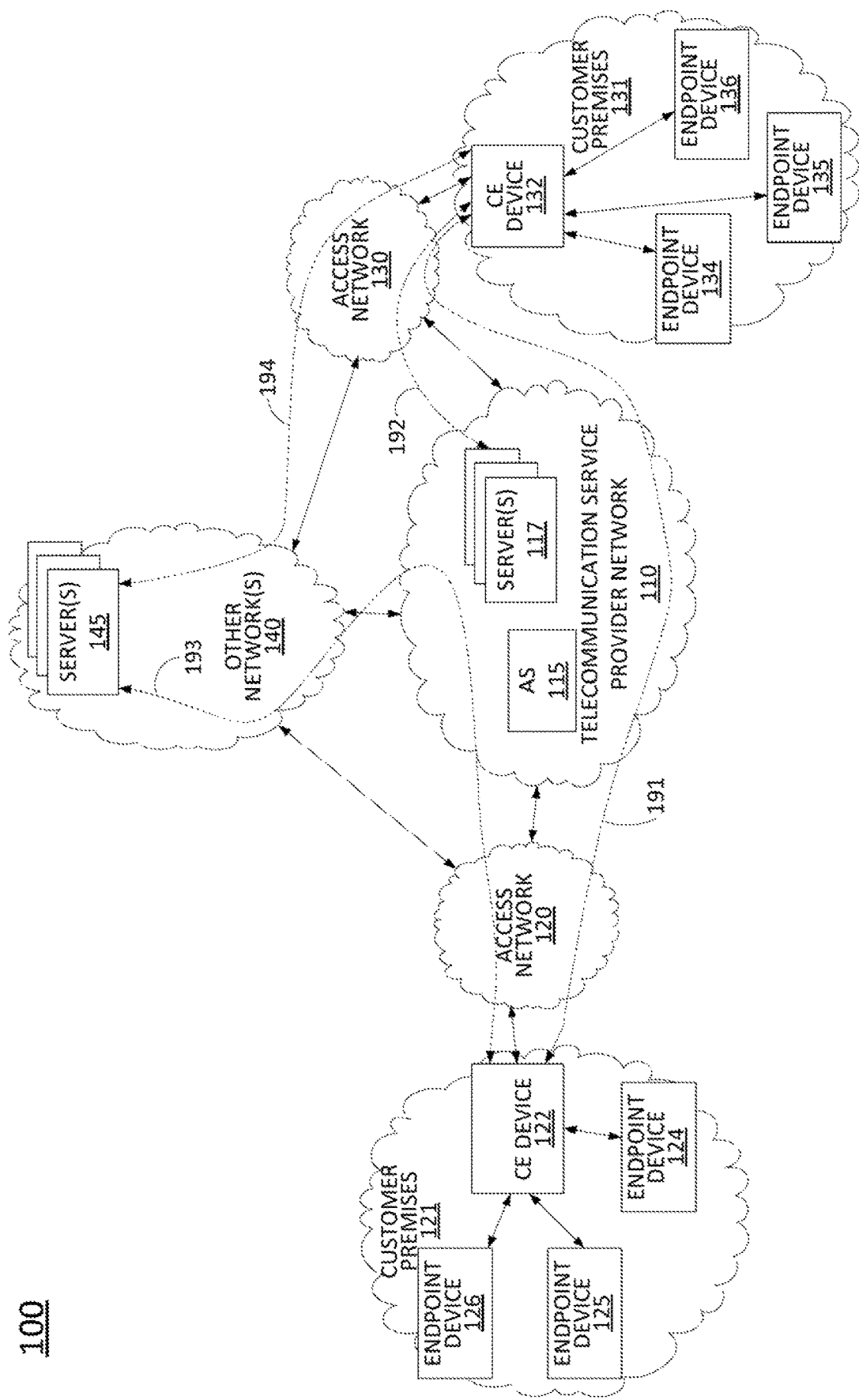
FIG. 1 illustrates an example network related to the present disclosure.

In one example, the present disclosure describes a method, computer-readable medium, and device for routing traffic of an endpoint device for a first network service via a virtual private network that is configured in accordance with a virtual private network configuration preference of an identified user. For instance, in one example, a method may include a processing system that is deployed at a customer premises and that includes at least one processor determining a first network service that an endpoint device is attempting to access, the first network service being one of a plurality of network services, and detecting an identity of a user of the endpoint device. The processing system may further obtain, from a network-based device, a plurality of virtual private network configuration preferences of the user, each of the plurality of virtual private network configuration preferences matching a virtual private network configuration preference with one of the plurality of network services, and route traffic of the endpoint device for the first network service via a virtual private network that is configured in accordance with a virtual private network configuration preference of the plurality of virtual private network configuration preferences that is matched to the first network service.

To illustrate, existing site-based virtual private networks (VPNs) are established only according to location/site. Examples of the present disclosure deploy and utilize white boxes at various locations (e.g., customer premises) to collect identifying information about customers. Using such data along with other information enables examples of the present disclosure to establish VPNs based on a customer's identity, preferences, and contexts relevant to the customer. In addition, closed user groups can be created based on such identifying and contextual information. In this way, VPNs can be identity-based instead of location-based for service provisioning, local/personal networking, etc.

In one example, an edge device receives a new flow and determines the source of the traffic. The edge device may also keep a database of users' VPN configuration preferences or may access VPN configuration preferences from a centralized network-based device. The edge device, the centralized network-based device, or both may also track contextual information for various users and/or their respective endpoint devices, such as which applications the users are accessing, which remote devices the users are accessing, the VPNs that the users establish and/or utilize, the settings for such VPNs, such as the types of VPN topologies, particular encryption protocols utilized, particular VPN providers utilized, and so forth. Over a period of time, users' VPN configuration preferences may be predictable and can be learned and stored.

For example, a user may be in a store and see sneakers that the user would like to purchase. The user may then check his/her bank account and go through an edge device at the store to access a banking website. The edge device may identify the user via his or her endpoint device. In one example, the user's endpoint device may also convey the user's VPN configuration preference(s) to the edge device. In another example, the edge device may request the user's VPN configuration preference(s) from a centralized network-based device. In one example, a uniform resource locator (URL) for the bank contained in the request may indicate to the edge device the proper context (e.g., user is checking banking information). The edge device may then establish a VPN or select a VPN for use in accordance with the user's identity, the user's VPN configuration preferences, and the present context.

In one example, the system may identify a user regardless of the particular device the user is currently using. A user could be known to use several different devices, but may be identified as currently being on one of the known devices. In one example, a user may be permitted to access protected resources via a VPN in accordance with the authentication of the user based upon his/her behavior, without regard to the device currently being used.

In one example, there may be a learning process the first time the user attempts to access network-based resources via a new device. For example, there may be a one-time authentication password the first time a device attempts to access network-based resources using a given active user profile. Thereafter, the endpoint device may be added to a list of devices associated with the user. Initially, a user may be prompted to provide a user identification (ID) and password. After information is collected in connection with the network utilization of a particular user, the user may be identified by the device(s) being used in conjunction with certain usage behaviors. For instance, a plurality of users may be associated with an endpoint device, e.g., a shared home computer, but only one of the users may be known to access a particular banking website via the endpoint device.

In one example, a centralized network-based device may learn users' VPN configuration preferences and push that information out to customer edge devices. The edge devices may then route traffic via the VPNs in accordance with these learned VPN configuration preferences. As just one example, the centralized network-based device may learn than when a user works on a remote desktop, a more secure VPN is utilized, but when the user is watching streaming video for entertainment a VPN that is faster, but which may be less secure, is utilized. Thus, these VPN configuration preferences may be provided to customer edge devices to establish and utilize VPNs that better match the user's VPN configuration preferences.

In one example, the system may establish a temporary, closed user group. For example, three users may be working on a project and a closed user group may be created for that project. If a location for one of the users changes, the system avoids having all of the users manually update VPN settings to include the new location. Instead, the change may be propagated to the respective VPN configuration preferences for the three users and updated accordingly in an automated fashion.

Examples of the present disclosure may apply to VPNs joining multiple enterprise locations. However, examples of the present disclosure may also apply to scenarios where a user may be a guest on a particular network. For example, at a hotel, a user may provide a name and a room number to access a network connection. In accordance with the present disclosure, a customer edge (CE) device (e.g., a hardware component of the hotel network) may interact with a centralized network-based device to obtain the user's preferences and contexts. In addition, the CE device may detect the user's network activities (e.g., accessing a website, connecting to cloud desktop, stream a movie from a content distribution network (CDN), etc.). In accordance with the user's activities/actions and the preferences provided by the centralized network-based device, the CE device of the hotel may establish a VPN, or utilize an existing VPN in accordance with the current user behavior and the user preferences (or allow a non-VPN connection for activities such as streaming movies).

Embodiments of the present disclosure therefore determine when to establish and/or utilize a VPN without the user explicitly requesting a VPN, and without having to configure such a VPN. In accordance with the present disclosure, VPN configuration preferences may be for accessing specific websites, URLs, IP addresses, etc., may be for different application uses, for different types of traffic or services, e.g., for cloud desktop versus streaming media, and so on. The system may dynamically learn over time that a user manually launches a VPN in connection with certain contexts, e.g., activities, types of traffic, particular applications, particular sites, and so forth. The system may also learn that particular encryption protocols may be utilized, particular VPN topologies may be utilized, particular VPN providers may be utilized, and so forth. For instance, after a threshold number of times of the same context, or after a threshold percent of a number of times in the same context that a user establishes a VPN with one or more settings, the system may then automatically configure a VPN with such setting(s), the next time the same context is encountered for the same user, e.g., the next time the user is determined to be engaged in the same or similar activities/action(s). These and other aspects of the present disclosure are described in greater detail below in connection with the examples of FIGS. 1-3.

To further aid in understanding the present disclosure, FIG. 1 illustrates an example system 100 in which examples of the present disclosure for routing traffic of an endpoint device for a first network service via a virtual private network that is configured in accordance with a virtual private network configuration preference of an identified user may operate. As illustrated in FIG. 1, the system 100 includes a telecommunication service provider network 110. In one example, telecommunication service provider network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication service provider network 110 uses a network function virtualization infrastructure (NFVI), e.g., host devices or servers that are available as host devices to host virtual machines comprising virtual network functions (VNFs). In other words, at least a portion of the telecommunication service provider network 110 may incorporate software-defined network (SDN) components.

As illustrated in FIG. 1, telecommunication service provider network 110 may include one or more servers 117 which may each comprise all or a portion of a computing device or system, such as computing system 300, and/or processing system 302 as described in connection with FIG. 3 below, specifically configured to perform various steps, functions, and/or operations in connection with examples of the present disclosure for routing traffic of an endpoint device for a first network service via a virtual private network that is configured in accordance with a virtual private network configuration preference of an identified user. For instance, servers 117 may comprise VPN sources and/or destinations (e.g., VPN clients, VPN servers, VPN gateways, VPN bridges, etc.) in accordance with the present examples. To illustrate, servers 117 may be managed by telecommunication service provider network 110 and may provide infrastructure for hosting one or more customer services and/or for hosting services managed by telecommunication service provider network 110 and offered to customers. For example, servers 117 may comprise network-based (e.g., cloud-based) infrastructure for storing corporate records, for hosting corporate accounting and personnel management software, for hosting remote desktop computing software for various organization personnel, and so forth.

Telecommunication service provider network 110 may also include an application server (AS) 115. In one example, AS 115 may comprise all or a portion of a computing device or system, such as computing system 300, and/or processing system 302 as described in connection with FIG. 3 below, specifically configured to perform various steps, functions, and/or operations for routing traffic of an endpoint device for a first network service via a virtual private network that is configured in accordance with a virtual private network configuration preference of an identified user, in accordance with the present disclosure. For example, AS 115 may store VPN configuration preferences of various users that are associated with various entities, and may provide such VPN configuration preferences to requesting devices that are authorized to receive such information. In addition, AS 115 may collect and track contextual information for various users and/or their respective endpoint devices, such as which applications the users are accessing, which remote devices the users are accessing, and so forth. AS 115 may therefore learn VPN configuration preferences for various users in connection with various contexts, including endpoint devices, various customer premises and access networks, various applications that may be accessed, various destinations, and so forth.

In one example, telecommunication service provider network 110 is connected to access networks 120 and 130. Each of the access networks 120 and 130 may comprise a circuit switched network (e.g., a public switched telephone network (PSTN)), a cable access network, a digital subscriber line (DSL) network, a metropolitan area network (MAN), other types of wired access networks, an Internet service provider (ISP) network, and the like. Alternatively, or in addition, access networks 120 and 130 may each comprise a wireless access network (e.g., an IEEE 802.11/Wi-Fi network and the like), a Wide Area Network (WAN), a cellular access network, such as an evolved Universal Terrestrial Radio Access Network (eUTRAN) that includes one or more eNodeBs, or the like. In one example, the access networks 120 and 130 may be different types of access networks or may be the same type of access network.

In one example, telecommunication service provider network 110, access network 120, and access network 130 may be connected to other networks 140. In one example, other networks 140 may represent one or more enterprise networks, a circuit switched network (e.g., a PSTN), a cable network, a digital subscriber line (DSL) network, a metropolitan area network (MAN), an Internet service provider (ISP) network, and the like. In one example, the other networks 140 may include different types of networks. In another example, the other networks 140 may be the same type of network. In one example, the other networks 140 may represent the Internet in general. As illustrated in FIG. 1, other networks 140 may include one or more servers 145 which may each comprise all or a portion of a computing device or system, such as computing system 300, and/or processing system 302 as described in connection with FIG. 3 below, specifically configured to perform various steps, functions, and/or operations in connection with examples of the present disclosure for routing traffic of an endpoint device for a first network service via a virtual private network that is configured in accordance with a virtual private network configuration preference of an identified user. For instance, servers 145 may comprise VPN sources and/or destinations in accordance with the present examples.

For example, servers 145 may comprise network-based (e.g., cloud-based) infrastructure for storing corporate records, for hosting corporate accounting and personnel management software, for hosting remote desktop computing software for various organization personnel, and so forth.

The other networks 140, the access network 120, access network 130, and the telecommunication service provider network 110 may be operated by different service providers, the same service provider, or a combination thereof. The other networks 140, the access network 120, the access network 130, and the telecommunication service provider network 110 may be interconnected via one or more intermediary networks (not shown) which may utilize various protocols and technologies for transporting traffic/communications in the form of data packets, datagrams, protocol data units (PDUs), and the like, such as one or more IP/MPLS networks, on or more frame relay networks, one or more ATM networks, and so forth.

In accordance with the present disclosure, endpoint devices 124-126 may access network-based services via a customer edge (CE) device 122, which may be in communication with access network 120. The CE device 122 may comprise a customer edge (CE) router, a gateway, a private branch exchange (PBX), and so forth, or any combination of such functionalities in a single device or a group of such devices at a customer premises 121. For instance, CE device 122 and endpoint devices 124-126 may represent equipment deployed at a first customer site/first customer premises.

Similarly, endpoint devices 134-136 may access network-based services via a customer edge (CE) device 132, which may be in communication with access network 130. The CE device 132 may comprise a CE router, a gateway, a PBX, and so forth, or any combination of such functionalities in a single device or a group of such devices at a customer premises 131. For instance, CE device 132 and endpoint devices 134-136 may represent equipment deployed at a second customer site/second customer premises. In one example, the customer premises 121 and 131 may be different locations of a same entity, e.g., local area networks (LANs) deployed at different corporate offices or corporate campuses, different university branches, different school sites for a school district, different facilities of a medical institution, and so forth. In another example, the customer premises 121 and 131 may represent different locations and equipment, e.g., for two different entities.

Figure 3:
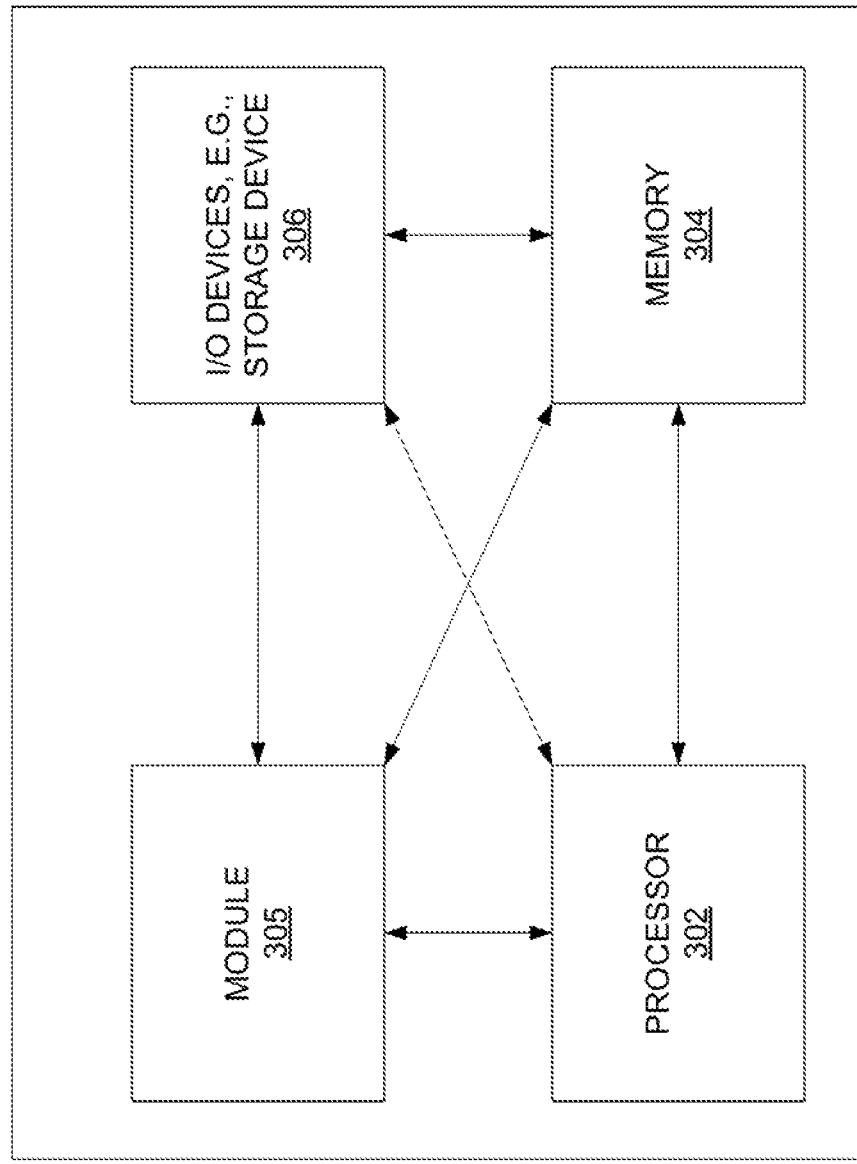
FIG. 3 illustrates a high level block diagram of a computing device specifically programmed to perform the steps, functions, blocks and/or operations described herein.

In accordance with the present disclosure, CE devices 122 and 132 may each comprise a computing system or server, such as computing system 300 depicted in FIG. 3, and may be configured to provide one or more operations or functions for routing traffic of an endpoint device for a first network service via a virtual private network that is configured in accordance with a virtual private network configuration preference of an identified user, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

To illustrate, endpoint device 124 may attempt to establish a communication with one of servers 145. The communication request may be received at CE device 122. In accordance with the present disclosure CE device 122 may request VPN configuration preferences for endpoint device 124, and/or for a user of endpoint device 124 from AS 115. The VPN configuration preferences may be applicable to various contexts, such as a particular destination (e.g., one of servers 145) or group of destinations, a particular destination IP address or group of destination IP addresses (e.g., a particular subnet, prefixes relating to a particular geographic region or telecommunication service provider, and so forth), to a particular port being used for the communication request, to a particular application on endpoint device 124 originating the request, to a particular service or protocol being utilized (e.g., a request relating to video streaming traffic versus general IP traffic, voice over IP (VoIP) traffic, and so forth), and so on. In one example, CE device 112 may include contextual information in the request to AS 115.

The VPN configuration preferences stored by AS 115 may identify certain contexts for which a VPN is to be utilized. In cases where the VPN configuration preferences indicate that a VPN is to be utilized, the VPN configuration preferences may further indicate required and/or preferred parameters, such as: a bandwidth, a throughput, a latency, an encryption protocol, a default gateway, a backup gateway, a proxy to utilize, a type of routing (e.g., an IP VPN versus a Multi-Protocol Label Switching (MPLS) VPN), a MPLS label, a port to utilize for inbound and/or outbound traffic, a specific VPN to utilize, a type of VPN to utilize (e.g., a site-to-site, a mesh, a hub-and-spoke), features included in the VPN paths (e.g., filtering, firewalls, load balancing, etc.), and so forth.

In one example, AS 115 may receive the request, and provide a VPN configuration preference (or VPN configuration preferences) in accordance with the information contained in the request. For instance, if the request identifies endpoint device 124 as the source and the one of servers 145 as the destination, AS 115 may retrieve a VPN configuration preference relating to endpoint device 124 (and/or the current user of endpoint device 124). The VPN configuration that is retrieved may further relate to contextual information, such as the destination comprising the one of servers 145. AS 115 may then return the VPN configuration preference to CE device 122. Alternatively, or in addition, AS 115 may identify that the request relates to endpoint device 124 (and/or a current user of endpoint device 124) and may return all VPN configuration preferences for endpoint device 124 (and/or a current user of endpoint device 124) to the CE device 122. In such an example, CE device 122 may then traverse the VPN configuration preferences searching for one or more VPN configuration preferences that match the request from endpoint device 124, e.g., the user's identity and the current context.

In the present example, the VPN configuration preferences may include a VPN configuration preference for endpoint device 124 that indicates that for traffic where the destination is one of servers 145 and the origin of the request is from customer premises 121, that a VPN via telecommunication service provider network 110 should be utilized. For instance, VPN 193 illustrated in FIG. 1 may be established by CE device 122 in accordance with such a VPN configuration preference. Alternatively, the VPN 193 may already be established and may simply be selected by CE device 122 for use in connection with the communication request from endpoint device 124.

For VPN 193, one of servers 117 may represent a VPN server, e.g., a VPN gateway that may be included in the VPN path by CE device 122. For instance, CE device 122 may receive traffic from endpoint device 124, may identify the destination as one of servers 145, and may encapsulate the traffic (e.g., one or more packets of the traffic) with a header that identifies one of servers 117 as a destination. In other words, CE device 122 establishes a VPN between itself and the one of servers 145 on behalf of endpoint device 124 and via one of servers 117. In one example, the traffic may identify one of servers 117 as an intermediate destination and may identify one of servers 145 as a final destination.

In another example, the CE device 122 may encapsulate the traffic (e.g., one or more packets of the traffic) with a header that identifies an ingress to the telecommunication service provider network 110 and that includes an MPLS label. For instance, the telecommunication service provider network 110 may comprise an MPLS network with MPLS nodes sharing information regarding specific MPLS labels and associated routes through the telecommunication service provider network 110. The ingress may comprise one of the servers 117 (e.g., a provider edge (PE) router) and may be identified with a URL, an IP address, or the like. Alternatively, the ingress may comprise a first one of the servers 117 (e.g., a PE router) and the MPLS label may be associated with a route that includes a second one of the servers 117. The communication may then be forwarded to the second one of the servers 117 in accordance with the MPLS label. To illustrate, the second one of the servers 117 may perform analytics on the MPLS traffic, such as load balancing, recordkeeping, anomaly signature detection, and so forth. For example, the second one of the servers 117 may perform various analytics on the encapsulated communication (e.g., with regard to the source, the destination, the originating network (e.g., access network 120), the destination network (e.g., one of other networks 140), the MPLS label, the particular VPN, the geographic area, etc.) without inspection of the contents of the communication. In one example, the various analytics may be performed by the second one of the servers 117 on behalf of the customer (e.g., associated with endpoint device 124 and customer premises 121). For instance, the customer may be interested to know how much traffic is carried via a specific VPN that may be utilized by its various personnel from customer premises 121 and/or other customer sites.

In another example, CE device 122 may receive a request from endpoint device 126 to access a particular dataset which may be stored/hosted on endpoint device 135. For example, customer premises 121 and customer premises 131 may comprise different locations of a corporate entity. In addition, endpoint device 126 may comprise a desktop computer of a user running an accounting/billing application while endpoint device 136 may comprise a server hosting corporate accounting and billing records. Similar to the first example, the communication request may be received at CE device 122. CE device 122 may then request VPN configuration preferences for endpoint device 126, and/or for a user of endpoint device 126 from AS 115. As in the previous example, CE device 122 may include contextual information in the request. The AS 115 may then return the VPN configuration preference for endpoint device 126 to CE device 122. Alternatively, or in addition, AS 115 may identify that the request relates to endpoint device 126 (and/or a current user of endpoint device 126) and may return all VPN configuration preferences for endpoint device 126 (and/or a current user of endpoint device 126) to the CE device 122. In such an example, CE device 122 may then traverse the VPN configuration preferences searching for one or more VPN configuration preferences that match the user identity and the context of the request from endpoint device 126. The VPN configuration preferences for endpoint device 126 (and/or a current user of endpoint device 126) may include a VPN configuration preference for endpoint device 126 that indicates that for traffic where the destination is at customer premises 131 and the request originates from customer premises 121, that a site-to-site VPN from CE device 122 to CE device 132 should be utilized.

In such case, the CE device 122 may utilize an already established site-to-site VPN from CE device 122 to CE device 132, or may set up such a VPN before sending the traffic for endpoint device 126 to endpoint device 136 via CE device 132 (e.g., VPN 191). In such case, the CE device 132 may encrypt the packets or other PDUs of the traffic in accordance with the applicable VPN configuration preference, may encapsulate the packets or other PDUs of the traffic with a header identifying CE device 132 as the destination, and so forth. The CE device 132, upon receiving the traffic, may strip the header(s) used for routing the traffic via the VPN 191, decrypt the traffic, and forward the traffic to endpoint device 136. In one example, endpoint device 136 may be addressed in the traffic as if it were in the same local area network (LAN) as endpoint device 126. For example, customer premises 121 and 131 may be different locations of a single entity that may be configured to share an address space and/or addressing scheme. Thus, devices at customer premises 121 and 131 may address traffic among one another without regard to any intervening networks and without regard to any VPN configuration(s) that may be utilized to convey the communications via such intervening networks.

It should also be noted that endpoint device 136 may similarly send traffic to endpoint device 126 via the same VPN 191. In particular, CE device 122 may establish the VPN 191 or may otherwise coordinate with CE device 132 to use VPN 191 for traffic between endpoint device 126 and endpoint device 136 responsive to the initial request from endpoint device 126. In this regard, it should also be noted that in one example, a VPN may be established on a temporary basis and may be released after a certain period of time after no communications are received for the VPN. Alternatively, or in addition, CE devices may maintain state information for a session associated with certain traffic of an endpoint device and may route the traffic via a VPN in accordance with the state information. After no communication for the session is detected for a certain period of time, the state information may be allowed to lapse. If the endpoint device again seeks to establish communications which fall under the same VPN configuration preference (e.g., the same type of communications with the same destination device or a destination device at a location that is covered by the same VPN configuration preference), the CE device may reestablish the state information in accordance with the above (e.g., requesting VPN configuration preferences from AS 115, establishing a VPN or setting up state information to utilize an existing VPN in accordance with an applicable one of the VPN configuration preferences, and so forth).

It should be noted that the examples described herein in connection with VPNs 191 and 193 are just two examples of how traffic/communications may be routed via the system 100 in accordance with VPN configuration preferences and that other, further, and different examples may relate to various other types of communications, may involve other types of VPN configurations, and so on. As just one additional example, CE device 132 may receive a communication request from endpoint device 134 which relates to accessing a cloud computing service (e.g., stored data, an application, etc.) which may reside on one of the servers 117 in telecommunication service provider network 110. CE device 132 may request and receive one or more VPN configuration preferences for endpoint device 134 and/or a user of endpoint device 134 from AS 115. CE device 132 may then establish VPN 192 or may select to utilize an existing VPN 192 to carry the traffic between endpoint device 134 and one of the servers 117 in accordance with an applicable one of the VPN configuration preferences associated with endpoint device 134 and/or a user of endpoint device 134. In another example, VPN 194 illustrates that a VPN configuration preference stored by AS 115 may include the establishment and/or use of a VPN that does not traverse telecommunication service provider network 110. For instance, CE device 132 may establish and/or utilize VPN 194 for communications between endpoint device 136 and one of the servers 145 in other networks 140. For instance, servers 145 may represent a public cloud computing infrastructure that may host various data and applications of an entity managing the customer premises 131. As such, VPN 194 may be utilized by one or more devices at customer premises 131 to access these remote resources.

In still another example, a VPN preference may identify a particular VPN service. For instance, the VPN may be established in accordance with a VPN client associated with a particular VPN service from among a plurality of different VPN service providers. The actual VPN may traverse a network infrastructure of one or more network service providers (e.g., telecommunication service provider network 110), access network 120 and/or access network 130, other networks 140, etc.). However, the VPN may initially be established via VPN servers associated with the VPN service before routing via the one or more public networks. For instance, one of servers 145 may represent a VPN hub and a VPN may be established between CE device 132 and CE device 122 via the VPN hub. Thus, these and other modifications are all contemplated within the scope of the present disclosure. In addition, as referred to herein a VPN may include one or more VPN tunnels or VPN bridges. For example, in a hub-and-spoke topology, VPNs 193 and 194 in FIG. 1 may represent VPN tunnels as part of a single VPN with one of the servers 145 comprising a VPN hub.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of telecommunication service provider network 110, access networks 120 and 130, and/or other networks 140 may comprise a content distribution network (CDN) having ingest servers, edge servers, and the like for packet-based streaming of video, audio, or other content that may be provided in course materials assembled in accordance with the present disclosure. Similarly, although only two access networks, 120 and 130 are shown, in other examples, access networks 120 and/or 130 may each comprise a plurality of different access networks that may interface with telecommunication service provider network 110 independently or in a chained manner. Thus, these and other modifications are all contemplated within the scope of the present disclosure.

Figure 2:
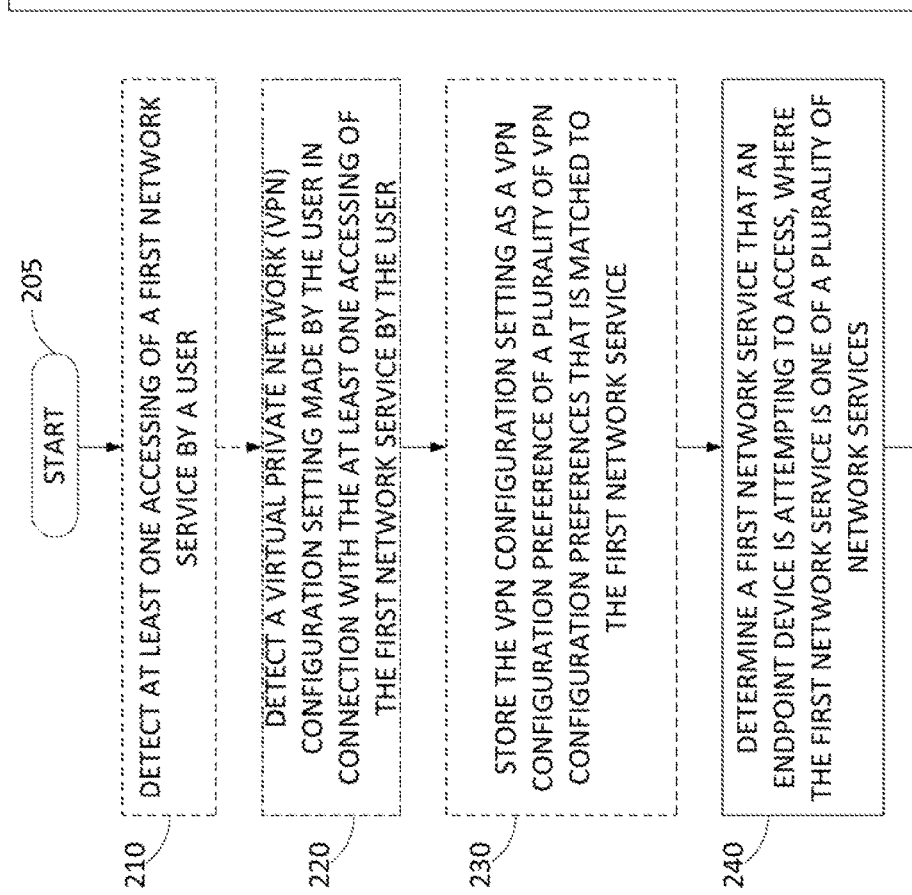
FIG. 2 illustrates a flowchart of an example method for routing traffic of an endpoint device for a first network service via a virtual private network that is configured in accordance with a virtual private network configuration preference of an identified user.

FIG. 2 illustrates a flowchart of an example method 200 for routing traffic of an endpoint device for a first network service via a virtual private network that is configured in accordance with a virtual private network configuration preference of an identified user, in accordance with the present disclosure. In one example, the method 200 is performed by a component of the system 100 of FIG. 1, such as one of the CE devices 122 or 132, and/or any one or more components thereof (e.g., a processor, or processors, performing operations stored in and loaded from a memory), or by one of the CE devices 122 or 132, in conjunction with one or more other devices, such as AS 115, servers 117, servers 145, and so forth. In one example, the steps, functions, or operations of method 200 may be performed by a computing device or system 300, and/or processor 302 as described in connection with FIG. 3 below. For instance, the computing device or system 300 may represent any one or more components of a CE device and/or other devices in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method begins in step 205 and may proceed to one of optional steps 210-230, or to step 240.

At optional step 210, the processing system may detect at least one accessing of a first network service by a user. For example, the processing system may comprise a customer edge (CE) device or a centralized network-based device and the user may be attempting to access the first network service via an endpoint device. The accessing of the first network service may be associated with a particular context, e.g., at least one of an application, a type of traffic, or a destination. For example, the first network service may be a particular accounting application that may be used to access network-based corporate accounting records. In another example, the first network service may comprise a remote desktop hosted on one or more network-based devices. In still other examples, the first network service may comprise a video streaming service, a web-conference service, and so forth. It should be noted that the first network service may be denoted by a specific destination device or a specific destination address (e.g., an IP address), a plurality of destination devices and/or destination addresses (e.g., a subnet comprising a range of IP addresses, or a list comprising any number of IP addresses), a uniform resource locator (URL) or a plurality of URLs, a domain, a plurality or domains, and or sub-domains, and so forth. The first network service may alternatively or additionally be identified by a type of traffic, with or without regard to the destination(s), (e.g., TCP traffic versus UDP traffic, traffic on a given port, or the like), the originating application on the endpoint device (e.g., an accounting application versus a media player application, a gaming application, etc.), and so on.

At optional step 220, the processing system may detect at least one virtual private network (VPN) configuration setting associated with the user in connection with the at least one accessing of the first network service by the user. For instance, the processing system may detect that a particular VPN gateway is selected in connection with a streaming media service, whereas a different VPN gateway may be selected in connection with accessing a banking website. In another example, processing system may detect that a VPN with a hub and spoke topology may be selected and/or established for use in connection with a web conference or screen sharing/remote access service, whereas the processing system may detect that a VPN with a site-to-site topology is selected and/or established for use in connection with the use of a chat application to chat with a colleague's endpoint device at another customer premises, and so on. The VPN configuration setting(s) may further comprise a type of encryption protocol that is used, bandwidth, latency, and/or other quality of service (QoS) aspects of the VPN, whether the VPN is a layer 2 or layer 3 VPN, whether the VPN is an IP-based VPN or an MPLS-based VPN, and so forth.

At optional step 230, the processing system may store the at least one VPN configuration setting as a VPN configuration preference of a plurality of VPN configuration preferences of the user that is matched to the first network service. For example, where the processing system may comprise a processing system of a CE device, the CE device may transmit the at least one VPN configuration setting to a network-based device. The network-based device may then provide the at least one VPN configuration setting to requesting devices (such as the same CE device or other CE devices). For instance, the same user may attempt to access the first network service from the same endpoint device or a different endpoint device via a CE device which may request the VPN configuration preference(s) of the user and which may establish a VPN in accordance with the configuration preference(s) and/or route traffic via the VPN in accordance with the configuration preference(s), and so on. When the processing system comprises a network-based device, step 230 may comprise storing the VPN configuration setting as a VPN configuration preference in an integrated or attached memory, or in a remote and/or a distributed memory that is accessible to the processing system. In one example, the network-based device may comprise one or more servers deployed in a telecommunication service provider network, for example.

At step 240, the processing system determines a first network service that an endpoint device is attempting to access, where the first network service is one of a plurality of network services. For instance, the first network service may comprise the same first network service that is described above in connection with optional steps 210-230.

At step 250, the processing system detects an identity of a user of the endpoint device. In one example, the identity of the user may be determined in accordance with at least one action of the user via the endpoint device. For instance, the at least one action may comprise a usage of at least a second network service via the endpoint device or a usage of an application via the endpoint device. To illustrate, a plurality of users may be associated with the endpoint device, but only one of the users may be known to access a particular banking website via the endpoint device, use a web conference application, etc. Similarly, in one example, the identity of the user may be determined in accordance with an identification of the endpoint device and an identification of the processing system. For instance, the processing system may comprise a customer edge (CE) device at a customer location/customer premises, and the user may be the only user who is known to use that particular endpoint device to access network services via that CE device. In one example, the identity of the user may alternatively or additionally be determined in accordance with a location of the endpoint device. For example, the user may be the only user who is known to use that particular endpoint device to access network services from a given location or set of locations. However, in one example, the identity of the user may be received from the endpoint device. For instance, if there are no known associations between the endpoint device and a user, the endpoint device may identify the user to the processing system, e.g., upon request from the processing system.

At step 260, the processing system obtains, from a network-based device, a plurality of VPN configuration preferences of the user, where each of the plurality of VPN configuration preferences is matched with one or more of the plurality of network services. For example, the processing system may request the plurality of VPN configuration preferences of the user from the network-based device. It should be noted that in the present example, the plurality of network services includes the first network service, and the plurality of VPN configuration preferences may include the VPN configuration setting that is stored in a VPN configuration preference at optional step 230. Accordingly, in one example, the plurality of VPN configuration preferences of the user is learned via at least one prior accessing of the first network service by the user. In one example, all or a portion of the plurality of VPN configuration preferences may alternatively or additionally be provided by the user. For instance, the user may add new VPN configuration preferences, may change or correct VPN configuration preferences that may be learned by the processing system and/or the network-based device, and so forth.

At optional step 270, the processing system may establish the VPN in accordance with the VPN configuration preference of the plurality of VPN configuration preferences that is matched to the first network service. For example, the processing system may first determine if a VPN that meets the criteria of the VPN configuration preference is already established. If not, the processing system may then set up and configure the VPN in accordance with the VPN configuration preference.

At step 280, the processing system routes traffic of the endpoint device for the first network service via a VPN that is configured in accordance with a VPN configuration preference of the plurality of VPN configuration preferences that is matched to the first network service. For example, the traffic may be routed via the VPN that is established at optional step 270, or via a VPN that is already established and that meets the criteria of the VPN configuration preference. Following step 280, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200 by determining additional attempts to access a network-based service in accordance with step 240, detecting an identify of a user associated with the attempt in accordance with step 250, and so on. In another example, the method 200 may be expanded to include multiple iterations of optional steps 210-230, e.g., detecting multiple accesses of the first network service by a user, detecting the VPN configuration setting(s) for the multiple accesses, and storing the VPN configuration setting (s) as VPN configuration preferences of the user for the first network service when a threshold number of instances of the same VPN configuration setting(s) for the same first network service for the same user are detected. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for routing traffic of an endpoint device for a first network service via a virtual private network that is configured in accordance with a virtual private network configuration preference of an identified user, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. For example, when the present method (s) are implemented in a distributed or parallel manner, any one or more steps of the present method(s) can be implemented by any one or more of the multiple or parallel computing devices of the processing system. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for routing traffic of an endpoint device for a first network service via a virtual private network that is configured in accordance with a virtual private network configuration preference of an identified user (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for routing traffic of an endpoint device for a first network service via a virtual private network that is configured in accordance with a virtual private network configuration preference of an identified user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   determining, by a processing system including at least one processor that is deployed at a customer premises, a first network service that an endpoint device is attempting to access, wherein the first network service is one of a plurality of network services;
   detecting, by the processing system, an identity of a user of the endpoint device;
   obtaining, by the processing system, from a network-based device, a plurality of virtual private network configuration preferences of the user, wherein each of the plurality of virtual private network configuration preferences is matched with one or more of the plurality of network services; and
   routing, by the processing system, traffic of the endpoint device for the first network service via a virtual private network that is configured in accordance with a virtual private network configuration preference of the plurality of virtual private network configuration preferences that is matched to the first network service.

2. The method of claim 1, further comprising:
   establishing the virtual private network in accordance with the virtual private network configuration preference of the plurality of virtual private network configuration preferences that is matched to the first network service.

3. The method of claim 1, wherein the processing system comprises a customer edge router.

4. The method of claim 1, wherein the identity of the user is received from the endpoint device.

5. The method of claim 1, wherein the identity of the user is determined in accordance with at least one action of the user via the endpoint device.

6. The method of claim 5, wherein the at least one action comprises:
   a usage of at least a second network service via the endpoint device; or
   a usage of an application via the endpoint device.

7. The method of claim 1, wherein the identity of the user is determined in accordance with a location of the endpoint device or a location of the processing system.

8. The method of claim 1, wherein the identity of the user is determined in accordance with an identification of the endpoint device and an identification of the processing system.

9. The method of claim 1, wherein the plurality of virtual private network configuration preferences is provided by the user.

10. The method of claim 1, wherein the first network service is associated with at least one of:
    an application;
    a type of traffic; or
    a destination.

11. The method of claim 1, wherein the processing system requests the plurality of virtual private network configuration preferences of the user from the network-based device.

12. The method of claim 11, wherein the plurality of virtual private network configuration preferences of the user is learned via at least one prior accessing of the first network service by the user.

13. The method of claim 12, wherein the network-based device:
    detects at least one accessing of the first network service by the user;

detects a virtual private network configuration setting made by the user in connection with the at least one accessing of the first network service by the user; and stores the virtual private network configuration setting as the virtual private network configuration preference of the plurality of virtual private network configuration preferences that is matched to the first network service.

14. A non-transitory computer-readable medium storing instructions which, when executed by a processing system including at least one processor, cause the processing system to perform operations, the operations comprising:

determining a first network service that an endpoint device is attempting to access, wherein the first network service is one of a plurality of network services;

detecting an identity of a user of the endpoint device;

obtaining, from a network-based device, a plurality of virtual private network configuration preferences of the user, wherein each of the plurality of virtual private network configuration preferences is matched with one or more of the plurality of network services; and routing traffic of the endpoint device for the first network service via a virtual private network that is configured in accordance with a virtual private network configuration preference of the plurality of virtual private network configuration preferences that is matched to the first network service.

15. The non-transitory computer-readable medium of claim 14, further comprising:

establishing the virtual private network in accordance with the virtual private network configuration preference of the plurality of virtual private network configuration preferences that is matched to the first network service.

16. The non-transitory computer-readable medium of claim 14, wherein the processing system comprises a customer edge router.

17. The non-transitory computer-readable medium of claim 14, wherein the identity of the user is received from the endpoint device or is determined in accordance with at least one action of the user via the endpoint device.

18. The non-transitory computer-readable medium of claim 14, wherein the plurality of virtual private network configuration preferences is provided by the user.

19. The non-transitory computer-readable medium of claim 14, wherein the plurality of virtual private network configuration preferences of the user is learned via at least one prior accessing of the first network service by the user.

20. A device comprising:

a processing system including at least one processor; and a computer-readable medium storing instructions which, when executed by the processing system when the device is deployed at a customer premises, cause the processing system to perform operations, the operations comprising:

determining a first network service that an endpoint device is attempting to access, wherein the first network service is one of a plurality of network services;

detecting an identity of a user of the endpoint device;

obtaining, from a network-based device, a plurality of virtual private network configuration preferences of the user, wherein each of the plurality of virtual private network configuration preferences is matched with one or more of the plurality of network services; and routing traffic of the endpoint device for the first network service via a virtual private network that is configured in accordance with a virtual private network configuration preference of the plurality of virtual private network configuration preferences that is matched to the first network service.

* * * * *